June 19, 1923.
C. W. BLUE
1,459,462
METER BOX
Filed Feb. 25, 1921
2 Sheets-Sheet 1
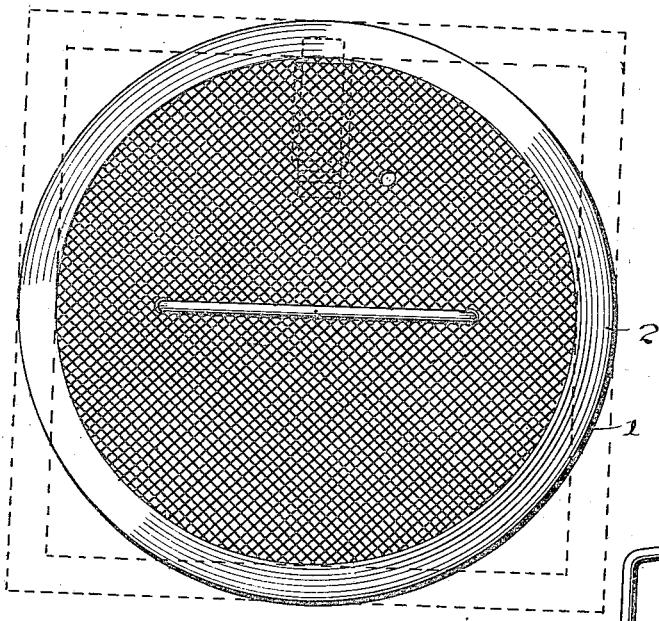
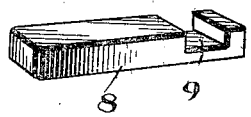
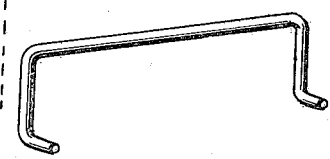
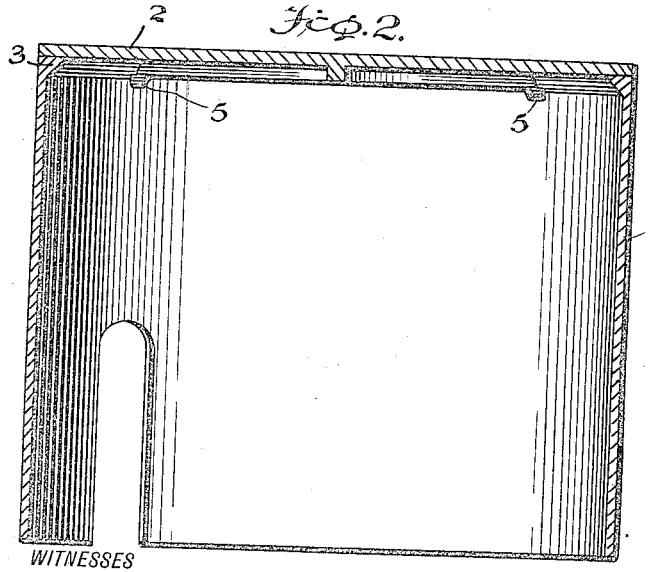
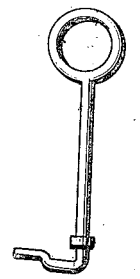
INVENTOR
C. W. Blue,
BY
ATTORNEYS

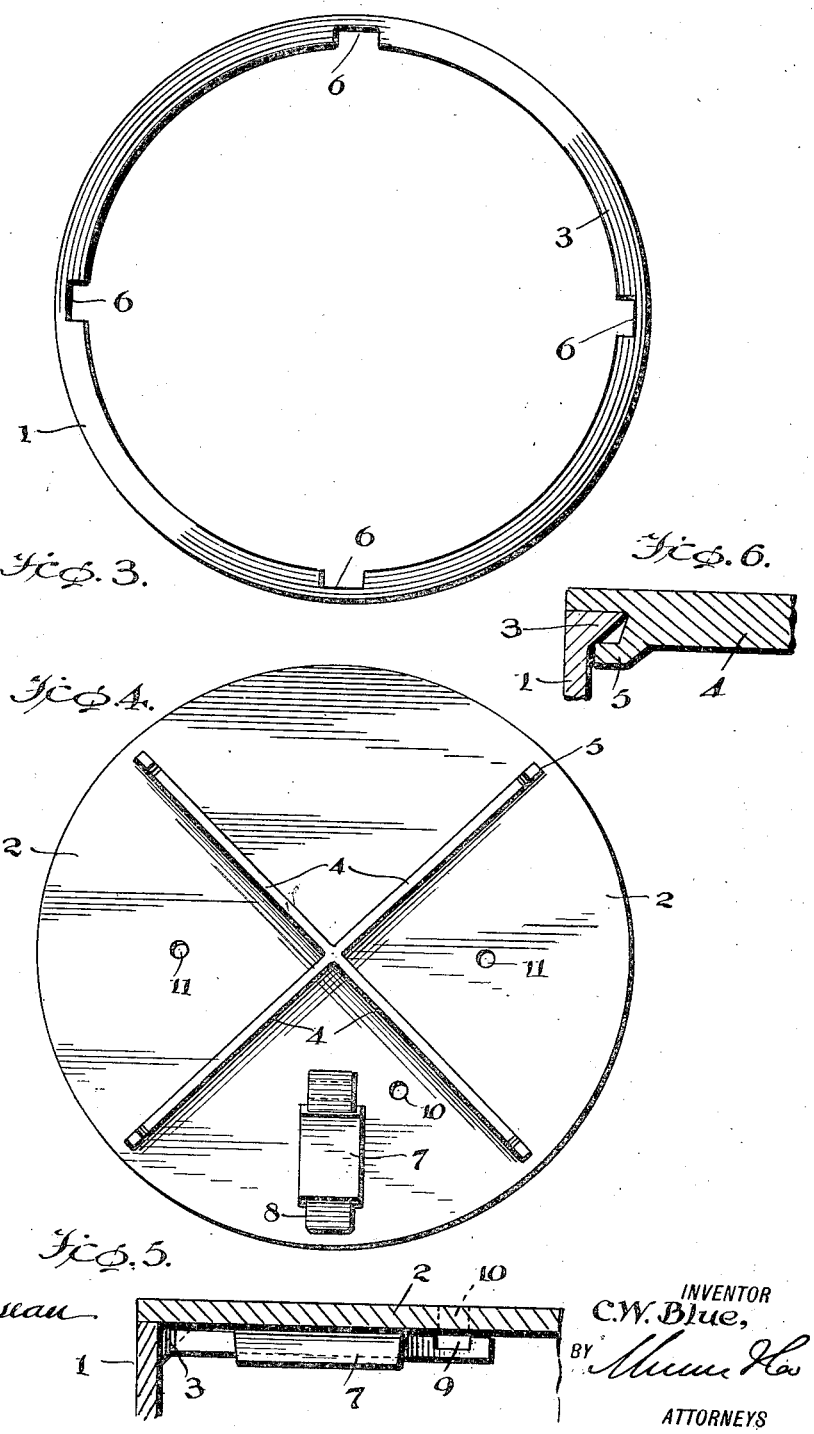

Patented June 19, 1923.

1,459,462

UNITED STATES PATENT OFFICE.

CHILTON WITHERS BLUE, OF MONTGOMERY, ALABAMA, ASSIGNOR TO JANNEY & COMPANY, OF MONTGOMERY, ALABAMA, A FIRM.

METER BOX.

Application filed February 25, 1921. Serial No. 447,701.

*To all whom it may concern:*

Be it known that I, CHILTON W. BLUE, a citizen of the United States, and a resident of Montgomery, in the county of Montgomery and State of Alabama, have invented certain new and useful Improvements in Meter Boxes, of which the following is a specification.

My invention relates to meter boxes, and is particularly directed to improvements in meter box closures.

The meter box which is the subject of my invention is of the kind which is usually buried in the ground with its top flush with the surface, and is generally located in exposed places where it can easily be tampered with by unauthorized persons. It is a matter of common knowledge that these boxes are often broken into by boys, actuated by motives of curiosity or mischievousness, with consequent injury to the box and annoyance to the authorities. The object of my invention is to provide a meter box closure of simple and strong construction, which may be securely locked at a plurality of points and which cannot be unlocked and opened except by a key of peculiar construction requiring a particular method of manipulation, and which, when unlocked by said key, cannot be removed until rotated to certain definite positions, thus making it highly improbable, if not impossible, that said closure will be removed by any unauthorized person.

Referring to the accompanying drawings for a full disclosure of the invention,

Figure 1 is a plan view of a meter box embodying my invention,

Figure 2 is a central vertical section thereof,

Figure 3 is a plan view of said box with the cover removed,

Figure 4 is a view of the under side of the cover,

Figure 5 is a sectional detail illustrating the lock on the under side of the cover, Figure 6 is a sectional detail showing an interlocking lug and flange on the cover and box, respectively, Figure 7 is a perspective view of the locking bolt, Figure 8 is a view of the bail for handling the cover, and Figure 9 shows a key for operating said locking bolt.

The meter box comprises, as usual, an open ended tubular casing 1, adapted to be buried in the ground with its upper end flush with the surface thereof, and a circular cover 2. These parts are usually formed of cast iron. Integrally formed with the upper edge of the casing is an inwardly extending annular flange 3. Formed on the underside of the cover are two ribs 4 which intersect at the center of the cover at right angles, the said ribs terminating in lugs 5 offset from the bottom of the cover so as to engage the under surface of said annular flange. In order to permit the cover to be applied, the annular flange is cut through or slotted at points 6 separated 90 degrees from each other. The cover can only be put on or taken off, therefore, when in such positions that the lugs 5 are in registry with the slots. On the under side of the cover between the ribs is a horizontal socket 7, and slidably mounted in said socket is a bolt 8, whose front end is adapted to be projected into a slot 6 and whose rear end is notched at 9 to receive the horizontal end of the key shown in Figure 9. The cover is further provided with a hole 10 through which the key is adapted to be inserted, and a pair of holes 11 for receiving the ends of the bail shown in Figure 8.

To put on the cover and lock it in position, the bail is inserted in holes 11 and the cover is lifted thereby and turned to a position where lugs 4 and 5 register with slots 6, in which position the cover can be lowered flush with the upper edge of the box. The cover is then rotated to a position where the locking bolt registers with a slot 6, whereupon the key is inserted through hole 10, manipulated to engage its end with notch 9 and then turned, projecting the bolt into the said slot. The cover is now securely locked in place by the bolt and by the interlocking engagement of the lugs and flange. It is locked from rotary movement by the engagement of the bolt in the slot, and it is locked from bodily displacement at four points by the engagement of the four lugs with the under surface of the flange 3. To remove the cover, therefore, requires not only the use of a key of a peculiar form but involves a knowledge of the structure of the closure, for even after the bolt is retracted the cover can only be removed when rotated to certain definite positions.

While in Figures 1, 3 and 4 I have indicated the shape of the box as circular, it will be understood that it may be made square, as indicated in dotted lines in Figure 1, the method of locking including a bolt sliding under the cover and propelled by a key, and made to engage on the underside of the flange which may be employed when so desired.

While I have described in detail an embodiment of my invention, I do not intend thereby to limit my invention to the exact details described, but what I claim as new and desire to secure by Letters Patent is:

1. A meter box consisting of a cylindrical casing having an inwardly projecting annular flange at its upper end, said flange having four slots cut therethrough at points separated from each other by ninety degrees, a cover for said casing having formed on its under side two ribs intersecting centrally thereof at right angles, said ribs terminating in lugs offset from the bottom of the cover, a socket formed on the under side of the cover between said ribs, a bolt slidably mounted in said socket with its outer end adapted to enter one of said slots and having an upwardly opening notch adjacent its inner end, said cover having a hole out of registry with said notch for the insertion of a suitable key.

2. A meter box consisting of a cylindrical casing having an inwardly projecting annular flange at its upper end, said flange having two diametrically opposed slots cut therein, a cover for said casing having formed on its underside a rib terminating in lugs offset from the bottom of the cover, a socket formed on the under side of said cover, a bolt slidably mounted in said socket with its outer end adapted to enter one of said slots and having an upwardly opening notch cut adjacent its inner end, said cover having a hole out of registry with said notch for the insertion of a suitable key.

3. A meter box comprising a casing having an inwardly projecting flange formed at its upper end, said flange having a plurality of slots cut therethrough, a cover for said casing having on its under side a plurality of lugs offset from the bottom thereof, said lugs and slots being equally spaced so as to register when the cover is in a certain position, a socket on the under side of said cover, and a bolt slidably mounted in said socket with its outer end adapted to enter one of said slots and having an upwardly opening notch adjacent its inner end, said cover having a hole out of registry with said notch for the insertion of a suitable key.

CHILTON WITHERS BLUE.